US007388196B1

(12) United States Patent
Hagerman

(10) Patent No.: US 7,388,196 B1
(45) Date of Patent: Jun. 17, 2008

(54) HYPERBOLIC HORN HELICAL MASS SPECTROMETER

(75) Inventor: James G. Hagerman, Honolulu, HI (US)

(73) Assignee: Pacific Environmental Technologies, LLC, Honolulu, HI (US)

( * ) Notice: Subject to any disclaimer, the term of this patent is extended or adjusted under 35 U.S.C. 154(b) by 385 days.

(21) Appl. No.: 11/297,238

(22) Filed: Dec. 7, 2005

(51) Int. Cl.
*B01D 59/44* (2006.01)
*H01J 49/00* (2006.01)

(52) U.S. Cl. ...................... 250/291; 250/281; 250/282; 250/287; 250/288; 250/289; 250/290; 250/292; 250/293; 250/294; 250/295; 250/423 R; 250/423 F

(58) Field of Classification Search ................ 250/281, 250/282, 287–295, 423 R, 423 F See application file for complete search history.

(56) References Cited

U.S. PATENT DOCUMENTS 5,726,448 A 3/1998 Smith

*Primary Examiner*—Jack I. Berman
*Assistant Examiner*—Meenakshi S Sahu
(74) *Attorney, Agent, or Firm*—Leighton K. Chong

(57) ABSTRACT

An improved rotating electric field ion mass spectrometer (REFIMS) provides for a smooth transition of the input ion beam from zero rotation to the desired level of field rotation. The REFIMS grid shape is changed from a fixed-diameter tunnel to that of a horn. The horn shape has a flare end with a larger entrance width that reduces the grid electric field strength to near zero and causes no abrupt deflection of the beam at the entrance, and tapers along the longitudinal z axis to a narrower width so that the field strength applied to the beam increases gradually until the correct field strength is obtained at its exit end for the desired rotation of the beam. Preferably, the horn shape in cross-section is hyperbolic, and the increase in field strength is approximately linear with distance along the z axis. The horn shaped device can provide a 2D spectral readout in which the ions are imaged on the target plane at radial positions increasing linearly with decreasing atomic mass units (amu).

14 Claims, 6 Drawing Sheets

(Horn Configuration of Entrance)

(Horn Configuration of Entrance)

(Target height versus amu, scale in mm)

HYPERBOLIC HORN HELICAL MASS SPECTROMETER

TECHNICAL FIELD

This invention generally relates to an improvement for a rotating electric field ion mass spectrometer (REFIMS), and more particularly, to one which reliably handles the ion input beam with better tolerance for entrance angle and sensitivity.

BACKGROUND OF INVENTION

A rotating electric field ion mass spectrometer (REFIMS) has an analyzer cell configured with an entrance end, four spaced-apart longitudinal walls to which time-dependent phased RF potentials are applied, and a detector at its target end. This type of REFIMS cell is described in detail in U.S. Pat. No. 5,726,448 issued on Mar. 10, 1998, to S. J. Smith and A. Chutjian, and is illustrated schematically in FIG. 1. The time-dependent RF potentials applied to the cell walls create an RF field which effectively rotates the ion beam within the cell. As the ions of the beam are rotated into a spiral path in the cell, the rotating RF field disperses the ion beam according to the mass-to-electrical charge (m/e) ratio and velocity distribution present in the ion beam. The ions of the beam are deflected angularly on the target detector, depending on the m/e, RF amplitude, and RF frequency. The detector counts the incident ions to determine the m/e and velocity distribution of ions in the beam, thereby providing a profile of the elemental constituents in the beam. One possible advantage of this type of device is that the spectral readout can be developed over a two-dimensional detector plane, which provides enhanced profile information for analysis as compared to the conventional one-dimensional (spot or line) spectral readouts. Further descriptions of this type of system are provided in: Clemmons, J. H., 1992, “Sounding rocket observations of precipitating ions in the morning auroral region”, Ph. D. dissertation, Univ. California, Berkeley, 135 pp; and Clemmons, J. H., and Herrero, F. A., 1998, “Mass spectroscopy using a rotating electric field”, Rev. Sci. Instruments 69, 2285-2291.

Unfortunately, the REFIMS device heretofore has had severe inherent problems relating to ion entrance angle and sensitivity that have made it practically unusable. The abrupt transition from free-space to the RF electric field between the grids requires that the ion entrance angle, offset, and timing coincide with the resonant helical path at an exact RF phase. Looked at in reverse, a resonant ion beam exiting the grids would travel out at a particular angle and offset radius, in contrast to the incident beam direction along the central longitudinal axis. Constructing a device with these limitations is possible, but the loss of sensitivity is remarkable. Only ions entering the chamber at the exact RF phase will resonate, all others are rejected, even if of the correct mass. If this tolerance is off by +/−1 degree, it means a sensitivity loss of 180 times, even before filtering takes place.

SUMMARY OF INVENTION

It is therefore a principal object of the present invention to provide an improvement on the REFIMS type of mass spectrometer that allows higher tolerance for entrance angle and sensitivity, so that the input ion beam is not rejected or does not suffer a severe loss of sensitivity even if the ions entering the chamber are not at the exact RF phase as the potential applied to the cell.

In accordance with the present invention, an improved rotating electric field ion mass spectrometer provides for a smooth transition for the input ion beam for the electric field strength in the cell by starting the field strength impact on the ion helical radius at zero and smoothly increasing it to the desired value for rotating the beam. This is accomplished by modifying the grid shape at the entrance from a fixed-diameter tunnel to that of a horn. Looking like the bell of a trumpet, the horn shape has a flare end with a larger entrance width that reduces the grid electric field strength to near zero and causes no abrupt deflection of the beam at the entrance, and tapers along the longitudinal z axis to a narrower width so that the field strength applied to the beam increases gradually until the correct angle, offset, and timing are obtained at its exit end for driving the beam into the desired rotation for the REFIMS device. Preferably, the horn shape in cross-section is hyperbolic, and the field strength increases linearly with distance along the z axis.

A particularly preferred hyperbolic horn shape is one in which the horn length is 10× and the maximum flare width is 2× the width of the cusp of the hyperbola. However, other curve shapes and other dimensional ratios may also be used. The invention thus makes the REFIMS type of cell usable without the need to precisely match the input ion beam with the RF potential amplitude, phase, and timing. It is usable to provide a 2D spectral readout in which the ions image the target plane in rings of increasing radius with decreasing amu. An inexpensive CCD array using a single readout row in the shape of a spiral can provide fast readout, show linear progression with increasing amu, and have a high spatial resolution.

Other objects, features, and advantages of the present invention will be explained in the following detailed description of the invention having reference to the appended drawings.

DETAILED DESCRIPTION OF INVENTION

The conventional design for a rotating electric field ion mass spectrometer (REFIMS) is described in detail in U.S. Pat. No. 5,726,448, which is incorporated herein by reference. Therefore, those aspects of the REFIMS device that are not germane to the improvement of the present invention are not described in further detail herein, as reference can be made to said patent for a further explanation if desired. In the following description, a preferred embodiment of the invention is described in detail to explain the principles of its construction and operation. However, it is to be understood that the scope of the invention is not limited to the described embodiment, but rather includes all variations, modifications, and equivalents thereto within the general principles of the invention described herein.

Figure 1:
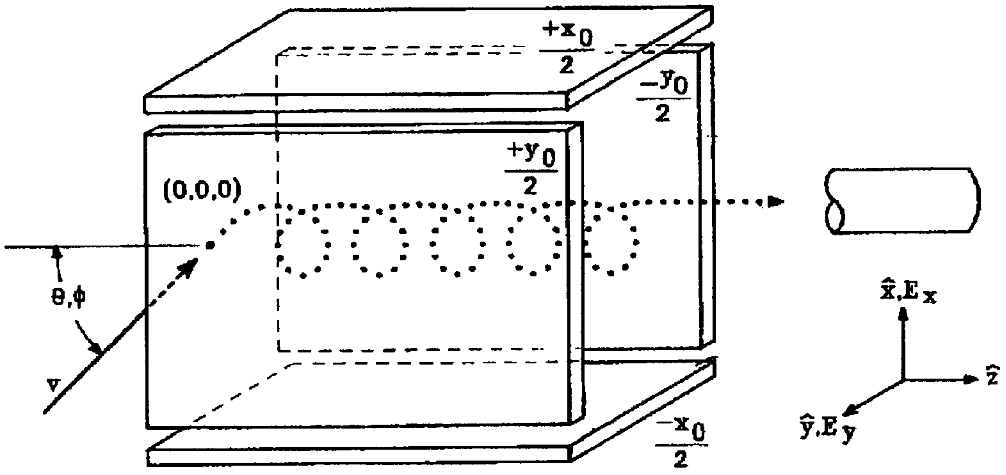
(Prior Art) FIG. 1
FIG. 1 shows schematically a rotating electric field ion mass spectrometer (REFIMS) as disclosed in the prior art.
Figure 2:
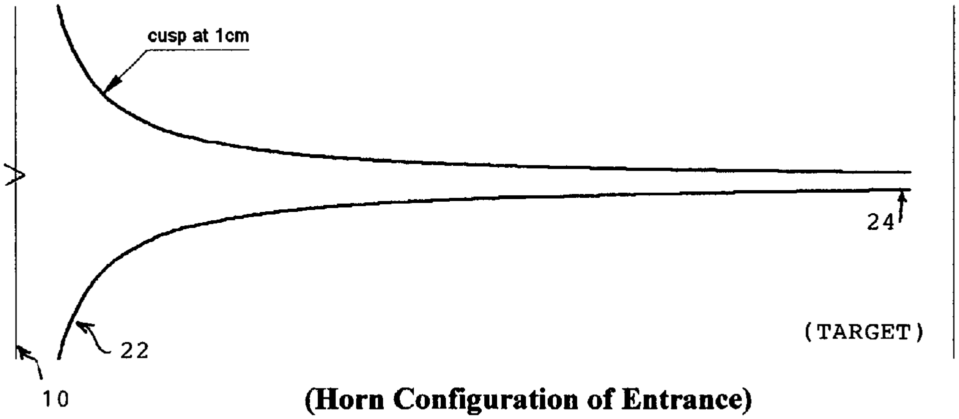
FIG. 2 shows schematically a grid in a horn shape for the REFIMS mass spectrometer in accordance with the present invention.

Referring to FIG. 2, the improvement for a rotating electric field ion mass spectrometer is comprised by a grid array having a horn-shape which has a flare end 22 with a larger width that effectively reduces the grid electric field strength to near zero, and tapering to a narrower width along the longitudinal z axis until the field strength applied to the beam at its exit end 24 exerts the desired rotation angle, offset, and timing for rotating the beam. As explained below, with proper dimensioning, the exact conditions for rotation of the beam can be obtained at the exit end 24 from the horn, so that no further part of the typical REFIMS grid is needed. Spaced from the entrance end 22 of the horn shape is a front wall 10 aligned in the x-y plane, which is also a grid plate held to roughly zero potential. A small aperture in the front wall is provided for input of the ion beam. The grid array can be fabricated in the horn shape with the benefit of simplicity in bore-sighted construction.

The helical trajectory of ion motion within a REFIMS is a sine function in both x and y dimensions. Acceleration along the z-axis is zero. Mathematical derivation in the xz plane is given by:

$$x(z) = \frac{-q\cdot V}{m\cdot\omega^2\cdot r_0}\cdot\cos(\omega\cdot t),$$

where $r_0$ is the radius of the grid tunnel, q is the ion charge, m is the mass, t is time, w is the angle of its trajectory, and V is the amplitude of RF voltage. It can be seen that electric field strength is inversely proportional to $r_0$. Therefore, if we set $$r_0 = \frac{1}{z},$$

the resulting field strength increases linearly with distance along the z-axis. This equation thus defines the shape of the horn, as shown in FIG. 2.

Technically known as a rectangular hyperbola, this function has the drawback of infinite radius at z=0. Fortunately, in practice an approximation is good enough. For this embodiment, a "ten-two horn" is specified. That is, the cusp radius is ten times the exit radius, the maximum flare radius is two times the cusp, and the horn length is ten times the cusp. This is shown to scale in FIG. 2. As a practical example, the horn length is 10 cm and the maximum (entrance) flare radius is 2 cm for a cusp radius of 1 cm.

Figure 3:
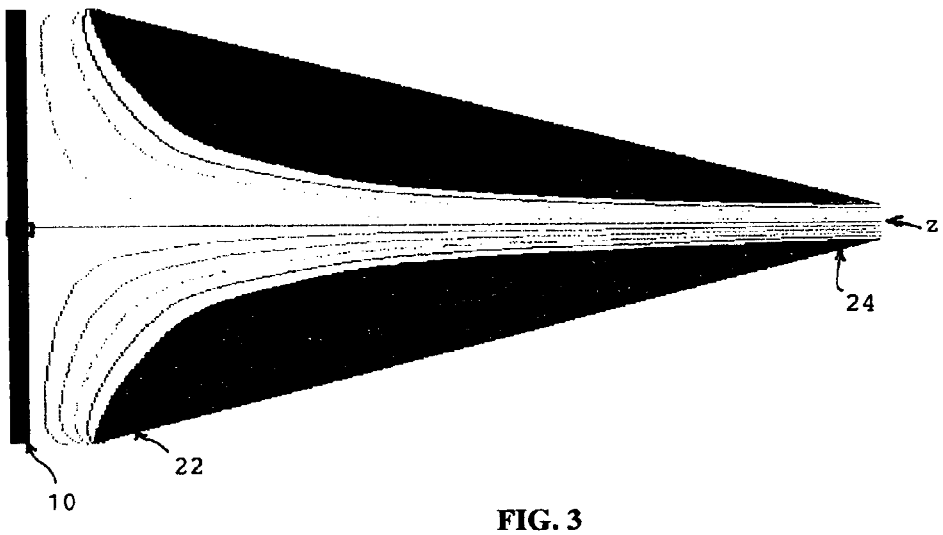
FIG. 3 shows the increasing strength of the electric field provided by the horn-shaped grid as the ion beam travels along the z-axis.
Figure 4:
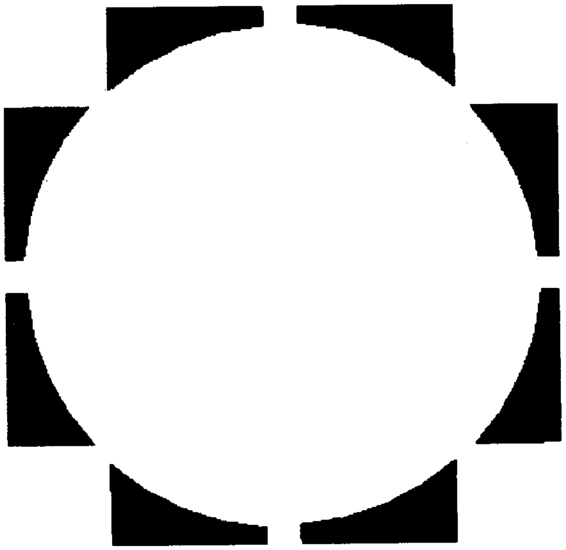
FIG. 4 shows (in plane cross-section) the preferred grid as an octopole array and illustrating a cross section of its rotating electric field.

In FIG. 3, the plot of iso-potential lines shows the electric field having increasing strength as the ion beam travels from an opening in the input plate 10 (left side of figure) along the z-axis to the exit end. The cross section is circular in shape. Although four grids are enough for proper operation, it is found that field linearity greatly improves when using a larger number of grids, especially at larger radii. Preferably, 8 or more grids are used, although 6 or 7 or 12 may also be used. The use of 8 grids provides for simplicity in generation of RF signal phases through 4 quadrants of rotation, which provides a good compromise of cost, complexity, and field quality. The preferred grid is therefore an octopole array, shown in FIG. 4, and a cross section of its rotating electric field is also illustrated.

Using inks units, the horn radius is redefined as:

$$r = \frac{1}{\mu\cdot z},$$

where μ is a conversion factor of $100^2$ (between cm and m, squared). This maintains the proper shape as specified but given in meters. The z position is related to time by:

$$z=v\cdot t,$$

where velocity is:

$$v = \sqrt{\frac{2\cdot q\cdot E}{m}}.$$

E is the potential voltage an ion is initially accelerated through. Once inside the horn, the ion drifts at constant velocity along the z-axis (approximate, as will be shown later). The electric field between grids is given by:

$$\Psi = \frac{V\cdot\cos(\omega\cdot t)}{r}.$$

The force on a charge is defined by:

$$F=q\cdot\Psi$$

so the acceleration on a charged particle (ion) is:

$$a = \Psi\cdot\frac{q}{m}.$$

To calculate position, the above equations are combined and acceleration is integrated twice in time.

$$a(t) = \frac{d^2x}{dt^2} = \frac{\mu\cdot v\cdot q\cdot V}{m}\cdot t\cdot\cos(\omega\cdot t).$$

To simplify first, the temporary substitution is used:

$$\lambda = \frac{\mu \cdot v \cdot q \cdot V}{m}$$

to get $$\frac{d^2 x}{dt^2} = \lambda \cdot t \cdot \cos(\omega \cdot t).$$

Integrating once obtains velocity.

$$\frac{dx}{dt} = \lambda \cdot \left[\frac{\cos(\omega \cdot t)}{\omega^2} + \frac{t \cdot \sin(\omega \cdot t)}{\omega}\right].$$

Integrating again for position, $$x(t) = \lambda \cdot \left[\frac{2 \cdot \sin(\omega \cdot t)}{\omega^3} - \frac{t \cdot \cos(\omega \cdot t)}{\omega^2}\right].$$

In practice it is found that the first term, a constant amplitude sinewave, is insignificantly small and dominated by the second term. Ion position then simplifies and is rewritten as a function of z by:

$$x(z) \approx -\frac{\mu \cdot q \cdot V}{m \cdot \omega^2} \cdot z \cdot \cos\left(\frac{\omega \cdot z}{v}\right).$$

This result shows that rotation amplitude x increases linearly with z. A typical ion beam trajectory for the horn-shaped grid is plotted in FIG. 5.

Operational parameters are now considered by applying physical dimensions and units. As described previously, the practical example of the horn cusp was set at 1 cm, giving an exit radius of 1 mm. The derived ion trajectory equation is a sine wave having amplitude of:

$$A = \frac{\mu \cdot q \cdot V \cdot z}{m_0 \cdot n \cdot (2 \cdot \pi \cdot f)^2}$$

where f is frequency. The number C of cycles per length is given by:

$$C = \frac{f \cdot z}{v},$$

where $$\omega = 2 \cdot \pi \cdot f$$

and $$m = m_0 \cdot n.$$

Particle mass is the proton rest mass $m_0$ (1.67 e−27 kg) times the number of protons n in atomic mass units (amu). Operating parameters can be determined by arbitrarily forcing the number of helix turns to ten (one per cm). Solving the turns per length formula for frequency gives:

$$f = \frac{v \cdot C}{z}.$$

Substitute in the formula for velocity $$f = \sqrt{\frac{2 \cdot q \cdot E}{m_0 \cdot n}} \cdot \frac{C}{z},$$

and it reduces to $$f = (1.38 \cdot 10^6) \cdot \sqrt{\frac{E}{n}}.$$

Similarly, the exit amplitude can be arbitrarily set equal to one-half the horn exit radius.

$$\frac{r}{2} = \frac{\mu \cdot q \cdot V \cdot z}{m_0 \cdot n \cdot 4 \cdot \pi^2 \cdot f^2}.$$

Solve for V, substitute in the solution for f, and it reduces to $$V = \frac{r \cdot m \cdot 2 \cdot \pi^2 \cdot (1.38 \cdot 10^6)^2 \cdot E}{\mu \cdot q \cdot z}$$

or $$V = (0.4) \cdot E.$$

Now that operating parameters have been reduced to simple functions of n and E, practical values for an actual device can be determined. The driver circuitry can be designed to easily produce RF signals up to 20V. Thus, the ion accelerating voltage is set to 50V. A mass spectrum is thereby swept using frequency, related to amu (n) by:

$$f = \frac{(9.8 \cdot 10^6)}{\sqrt{n}}.$$

Figure 6:
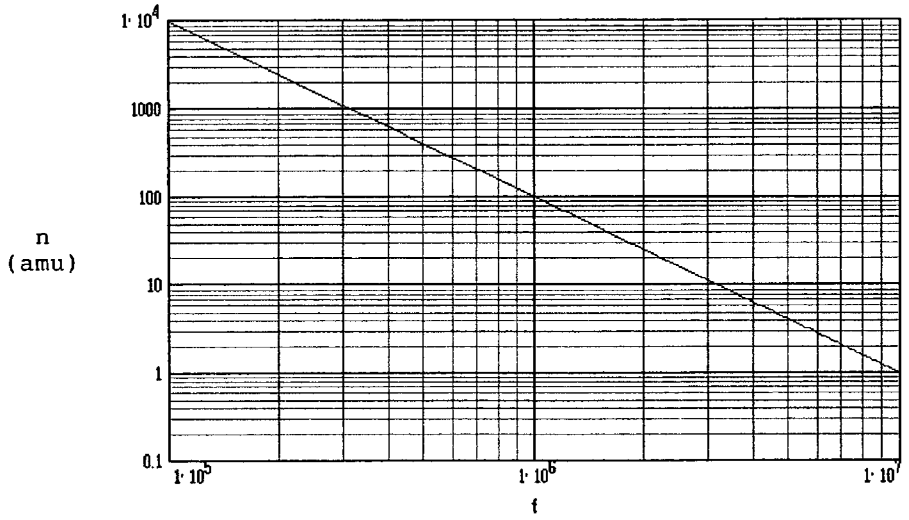
FIG. 6 shows a plot of the relationship between atomic mass units (amu) of ions in a beam and driving frequency.

FIG. 6 shows a plot of the relationship between atomic mass units (amu) of ions in a beam and driving frequency.

A resonant ion is driven so that its exit radius is less than that of the exit end of the horn. As one method for spectral analysis, the device can be used as a filter. Light ions will crash into the horn grids, heavy ions will propagate down the center at smaller radii. Therefore, detection of a resonant ion is preferably done using a ring detector. Only ions exiting at a particular radius will be counted.

Another method is to use a disc-shaped detector that catches all heavy ions. This is akin to a low pass filter. As the frequency increases, so does collection current, creating essentially an integrated spectrum, appearing like a descending staircase versus increasing frequency. The knife-edge of the disc produces sharp transitions, however, the numerical differentiation required to produce a normal spectrum is plagued by noise. A combined approach of this and the first-described method may achieve best results. With both disc and ring detectors, data are maximized for optimal post processing.

Positioning of the detectors is best done at a finite distance from the exit of the horn. This gives some magnification to the ion radius (similar to the flight into a REFIMS) and reduces centering errors. The exit angle is given by:

$$\theta = \arctan\left(\frac{2\cdot\pi\cdot r_i}{z_i}\right),$$

where $r_i$ is the ion exit radius and $z_i$ is the ion period. For example, an exit angle of up to 17 degrees might be computed for the above-described operating conditions.

To evaluate for possible error introduced in the horn-shaped REFIMS device, an initial assumption was that acceleration along the z-axis is zero. This is not exactly correct, as there is bending of the electric fields lines, creating a z component to the field vector. If a particle has a radius equal to the horn at exit, then it sees a reversing voltage equal to V. By setting "resonance" to half the horn exit radius, particle deceleration is V/2, or 10 eV. Given an initial velocity of 50 eV, this causes a decrease in ion velocity of 10%, diverging from predicted operation. The effect is that there will be approximately eleven helical cycles instead of ten, as the particle slows down. Similarly, there is a corresponding increase, or restoration of velocity after the particle exits the horn, prior to striking the detector plane.

The horn-shaped mass spectrometer device is expected to require lower power for RF circuitry as compared to common quadrapole mass spectrometers. Quadrapole devices typically run at a constant frequency, and the dc and ac voltages are ramped up in amplitude to perform a spectral sweep. The voltages are extremely high, often over 1000V and up to 3000V. By comparison, the horn-shaped mass spectrometer can be run at low voltages of about 20V, which would offer benefits in terms of safety, simplicity, insulation, and cost.

Figure 5:
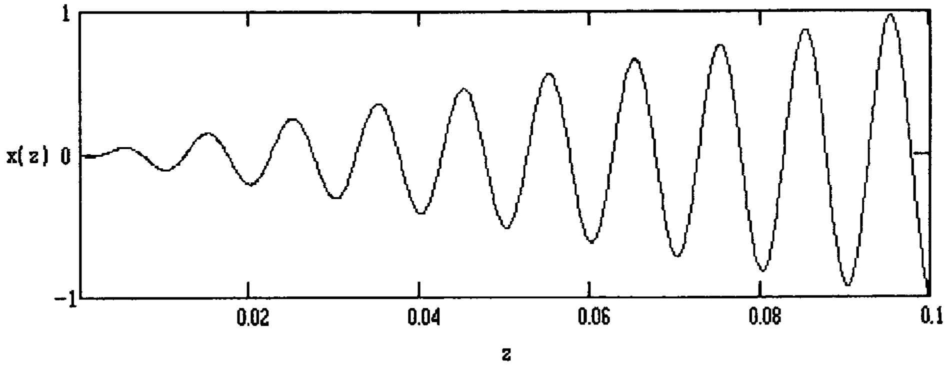
FIG. 5 shows a plot for a typical ion beam trajectory for the horn-shaped grid.

The horn-shaped mass spectrometer device drives input ions in a helical trajectory to the target plane (see FIG. 5 for view in the x-z plane). Ions of the same amu are distributed in radially symmetric ring patterns at the target plane, with ions across a given amu range forming a 2D spectrographic image. As an ion exits the horn it continues on a tangential path. The greater the distance to the detector plane, the greater the magnification of the resonant radius, and the sensitivity to center offset error is reduced. The rotating electric fields at the exit of the horn assembly are just as critical as at the entrance. The field strength must be decreased as rapidly as possible to prevent further ion deflection. This is done symmetrically by making the target plane 10 a ground plane, having the same dc potential as the horn grids. This is easy to do since the electrometers used in detection are inherently grounded via feedback. Surrounding the Faraday collectors with a fixed ground completes the target image plane, such that the resulting field may be characterized by isopotential lines. As can be seen, the field strength rapidly decreases and changes direction. In fact, it is similar to the field at the horn entrance, but far more abrupt. Therefore, the effect on the ion is smoothly decreased to zero, to where the ion drifts freely. For this analysis, it is assumed that this is close enough to a free field that an ion continues tangentially to the velocity vector given the horn exit. The fields might be improved by the addition of another grounded aperture right at the horn exit, or using a cup-shaped shield.

The resonant ions exit the horn at a specific radius. The general formula for this trajectory is given [1] by $$x(z) \approx -\frac{\mu\cdot q\cdot V}{m\cdot\omega^2}\cdot z\cdot\cos\left(\frac{\omega\cdot z}{v}\right).$$

Figure 7:
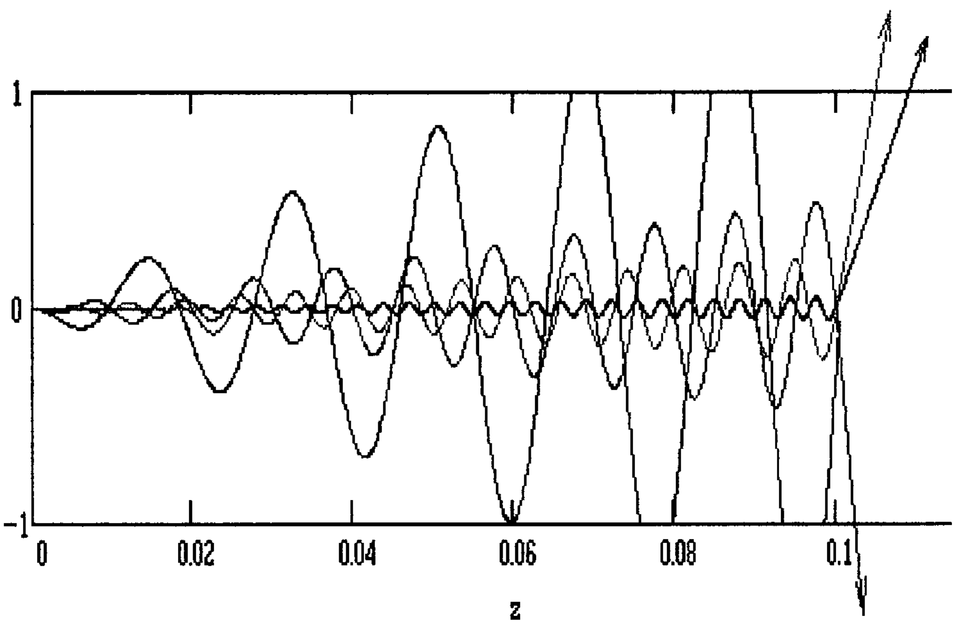
FIG. 7 shows the trajectories of various ion masses for the horn-shaped device.
Figure 8A:
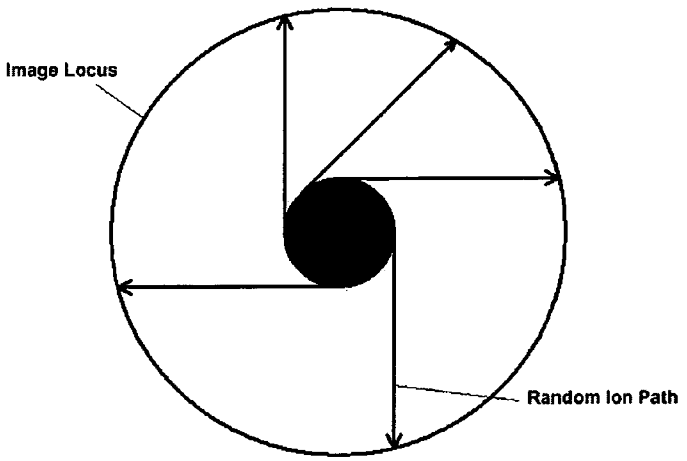
FIG. 8A illustrates a view of the ion path forming an image locus as seen looking down the z-axis.
Figure 8B:
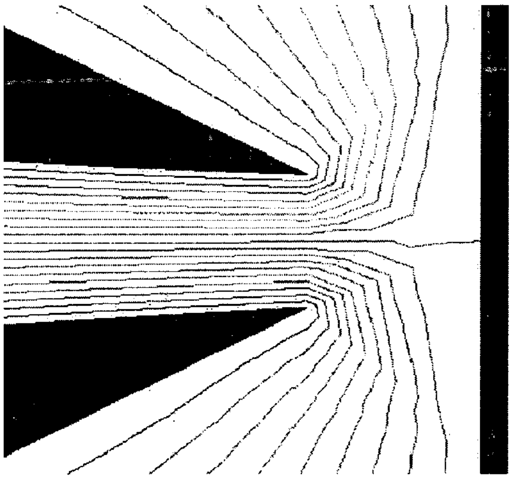
FIG. 8B shows the ion path to a target plate in a plane view along the z-axis.
Figure 9:
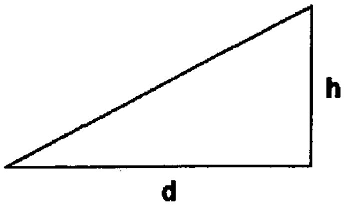
FIG. 9 illustrates the exit angle for any given ion mass determining the radial position h on the target plane depending on distance d to the target plane.

FIG. 7 shows the trajectories of various ion masses for a given set of operating conditions. The lighter ions crash into the horn grids, while the heavier ones pass through with decreasing exit angles. Calculating the exit angle requires taking into account some perpendicular axis offset, which effectively increases the resulting target radius. FIG. 8A illustrates an image locus formed by the ions looking down the z-axis. The force field and ion path to the target plate 30 is shown in plane view in FIG. 8B. Lengthening the drift distance d minimizes the error contributed by the offset so that it can be ignored. As shown in FIG. 9, the exit angle is a function of the exit radius h and distance d, and for any given ion mass m is calculated by differentiating the solution for the trajectory, as follows:

$$\tan\theta = \frac{h}{d} = \frac{dx(z)}{dz} = \frac{d}{dz}\left[-\frac{\mu\cdot q\cdot V}{m\cdot\omega^2}\cdot z\cdot\cos\left(\frac{\omega\cdot z}{v}\right)\right].$$

This solves as:

$$\frac{h}{d} = \left(\frac{\mu\cdot q\cdot V}{m\cdot\omega\cdot v}\right)\cdot z\cdot\sin\left(\frac{\omega\cdot z}{v}\right).$$

Due to rotational symmetry, the sine term can be dropped. Substituting the solution for v, the exit angle equation reduces to:

$$\frac{h}{d} = \frac{\mu\cdot V\cdot z}{\omega}\sqrt{\frac{q}{2\cdot m\cdot E}}\,.$$

The height h is the target radius at a given distance d to the target. All of the other parameters are known or can be set to desired values. Representative values are as follows:

$z=0.1$ $E=50$ $V=20$ $\mu=100^2$ $m=n\cdot 1.67\cdot 10^{-27}$ $q=1.6\cdot 10^{-19}$ $\omega=2\cdot\pi\cdot f$ where n is the amu count, and d is set to 5 mm (0.005 m).

The target radial height h reduces to $$h = \frac{15{,}600}{f \cdot \sqrt{n}}.$$

Figure 10:
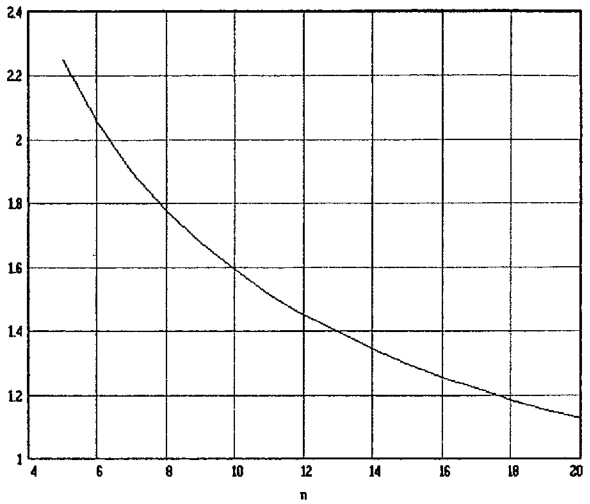
FIG. 10 is a plot of the target position h versus amu, representing the resulting image radii at this frequency.

FIG. 10 is a plot of the target position h versus amu, representing the resulting image radii at a given resonant frequency. This illustrates a general solution for using a plane array detector at any given distance from the horn exit. For the given resonant frequency, the ion radius h is proportional to the inverse root of n. Resolution is reasonable only over a small range, as the heavier ions have an asymptotic solution (approaching zero radius). In the example above, a detector would be practical for parallel spectral readout from about 5 amu to 15 amu.

Figure 11:
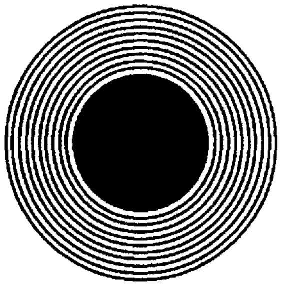
FIG. 11 illustrates a 2D spectral image obtainable with the horn-shaped device.

With decreasing amu, the target will image additional rings concentrically, each having a greater radius, thereby obtaining a 2D spectrograph image as illustrated in FIG. 11. For a convenient linear-in-amu readout, the radii should have the same square root function as determined above. Such non-linear spacing then results in a perfect parallel spectral readout, using a minimum of detectors.

Figure 12:
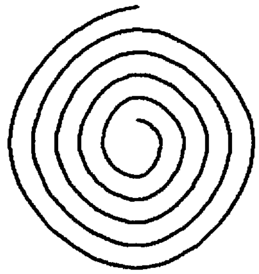
FIG. 12 shows a design for a CCD detector using a single readout row in the shape of a spiral.

Recent technical advances have made the use of CCD devices practical as ion detectors. However, using a standard two-dimensional CCD type array structure for a detector does not take advantage of the inherent rotational symmetry of the target image plane. A price is paid in complexity, overhead, and efficiency. There is an overwhelming increase in data, proportional to the number of pixels squared. Comparatively, a simple ten-ring detector is the equivalent of a 100 pixel CCD type array. There is a computational penalty for grid decomposition into polar coordinate, summation, and translation of non-linear response to amu. Sensitivity is also partially lost due to charge being spread out over many pixels, instead of just one. Changing the array structure can alleviate all these problems. Rather that using a rectangular array, one could design a custom CCD using a single readout row in the shape of a spiral, as shown in FIG. 12. The radius of such a spiral would be non-linear, following the inverse root function described above. The result would be an extremely fast parallel readout, linear in amu, and having very high spatial resolution.

In summary, the invention provides for the use of a horn-shaped grid in the REFIMS type of mass spectrometer for a smooth transition of the input ion beam from zero rotation in the x-y plane to the desired field rotation for deflection of the ions consistent with their mass. The input ion beam does not suffer any ion rejection (unless purposefully configured for filtering) or any severe loss of sensitivity. The transition from zero rotation to the desired field rotation is a smooth one that linearly increases, so that the input of ions into the chamber can be independent of the RF phase potentials applied to the cell grids. The preferred horn shape is hyperbolic, and the specific example shown herein is a "ten-two horn" in which the horn length is 10× and the maximum flare width is 2× the width of the cusp of the hyperbola. However, other curve shapes and other dimensional ratios may also be used. The invention thus makes the REFIMS type of cell usable without the need to precisely match the input ion beam with the RF potential amplitude, phase, and timing. It makes this type of device usable to provide a 2D spectral readout in which the ions image the target plane in rings of increasing radius with decreasing amu. An inexpensive CCD array using a single readout row in the shape of a spiral can provide fast readout, show linear progression in amu, and have a high spatial resolution.

It is understood that many modifications and variations may be devised given the above description of the principles of the invention. It is intended that all such modifications and variations be considered as within the spirit and scope of this invention, as defined in the following claims.

The invention claimed is:

1. An improved rotating electric field ion mass spectrometer comprising:

a grid array arranged along a longitudinal (z) axis having an entrance end for receiving an input ion beam, an exit end for directing an output of the ion beam toward a detector, and an internal space between the entrance end and exit end for rotating the ion beam in a phase-driven electric field, wherein the grid array in cross-section has a horn shape extending along the z axis that provides for a smooth transition for the ion beam subjected to the grid electric field from its input at the entrance end to a desired value for rotating the beam for its output at the exit end.

2. An improved rotating electric field ion mass spectrometer according to claim 1, wherein the electric field strength on the ion beam at the entrance end is near zero and smoothly increases to the desired value for the field strength to be applied to the ion beam at the exit end.

3. An improved rotating electric field ion mass spectrometer according to claim 1, wherein the horn shape in cross-section is hyperbolic.

4. An improved rotating electric field ion mass spectrometer according to claim 1, wherein the horn shape results in the electric field strength applied to the ion beam increasing linearly to the desired value for the field strength applied to the ion beam at the exit end.

5. An improved rotating electric field ion mass spectrometer according to claim 1, wherein the horn shape in cross-section is hyperbolic in which the horn length is 10× and a maximum flare width at the entrance end is 2× the width of the cusp of the hyperbola.

6. An improved rotating electric field ion mass spectrometer according to claim 1, further comprising a front wall spaced from the entrance end to the grid array and arranged in a plane perpendicular to the z axis and provided with a central aperture for introducing the ion beam into the entrance end.

7. An improved rotating electric field ion mass spectrometer according to claim 6, wherein the front wall is a grid that is held to roughly zero electric potential.

8. An improved rotating electric field ion mass spectrometer according to claim 1, wherein the device is used as a filter allowing only heavy ions to propagate down the center of the grid array at smaller rotational radii, and detection of resonant ions is done using a ring detector positioned at a given distance from the horn exit end.

9. An improved rotating electric field ion mass spectrometer according to claim 1, wherein the device is used as a filter allowing only heavy ions to propagate down the center of the grid array at smaller rotational radii, and detection of resonant ions is done using a disc-shaped detector that catches all heavy ions.

10. An improved rotating electric field ion mass spectrometer according to claim 1, wherein the device is used as a filter allowing only heavy ions to propagate down the center of the grid array at smaller rotational radii, and detection of resonant ions is done using a ring detector combined with a disc-shaped detector.

11. An improved rotating electric field ion mass spectrometer according to claim 1, wherein the device has a detector positioned at a target plane spaced from the horn exit end to provide a two-dimensional spectral readout.

12. An improved rotating electric field ion mass spectrometer according to claim 11, wherein the target plane is a ground plane having the same dc potential as the horn grids.

13. An improved rotating electric field ion mass spectrometer according to claim 11, wherein the 2D spectral readout is imaged at the target plane in rings of radius increasing approximately linearly with decreasing atomic mass units (amu).

14. An improved rotating electric field ion mass spectrometer according to claim 11, wherein the detector is a CCD array formed on the target plane in a single readout row in the shape of a spiral.

* * * * *